US009085988B2

(12) United States Patent
Kwon et al.

(10) Patent No.: US 9,085,988 B2
(45) Date of Patent: Jul. 21, 2015

(54) GAS TURBINE ENGINE FLOW PATH MEMBER

(75) Inventors: Okey Kwon, Indianapolis, IN (US); Jeffrey F. Rhodes, Zionsville, IN (US)

(73) Assignee: Rolls-Royce North American Technologies, Inc., Indianapolis, IN (US)

(*) Notice: Subject to any disclaimer, the term of this patent is extended or adjusted under 35 U.S.C. 154(b) by 628 days.

(21) Appl. No.: 13/335,276

(22) Filed: Dec. 22, 2011

(65) Prior Publication Data

US 2012/0189427 A1    Jul. 26, 2012

Related U.S. Application Data

(60) Provisional application No. 61/427,132, filed on Dec. 24, 2010.

(51) Int. Cl.
| | |
|---|---|
| *F01D 25/12* | (2006.01) |
| *F01D 5/20* | (2006.01) |
| *F01D 5/18* | (2006.01) |

(52) U.S. Cl.
CPC ...... *F01D 5/20* (2013.01); *F01D 5/187* (2013.01); *F05D 2260/201* (2013.01); *F05D 2260/202* (2013.01); *Y02T 50/673* (2013.01); *Y02T 50/676* (2013.01)

(58) Field of Classification Search
USPC ..... 416/90 R, 92, 95, 96 R, 97 R, 232, 223 A
See application file for complete search history.

(56) References Cited

U.S. PATENT DOCUMENTS

| | | | |
|---|---|---|---|
| 5,261,789 A | 11/1993 | Butts et al. | |
| 5,626,462 A * | 5/1997 | Jackson et al. | 416/97 R |
| 5,660,523 A | 8/1997 | Lee | |
| 6,059,530 A | 5/2000 | Lee | |
| 6,164,914 A * | 12/2000 | Correia et al. | 416/97 R |
| 6,179,556 B1 | 1/2001 | Bunker | |
| 6,190,129 B1 | 2/2001 | Mayer et al. | |
| 6,461,107 B1 | 10/2002 | Lee et al. | |
| 6,991,430 B2 | 1/2006 | Stec et al. | |
| 7,001,151 B2 | 2/2006 | Wang et al. | |
| 7,118,342 B2 | 10/2006 | Lee et al. | |
| 7,300,251 B2 * | 11/2007 | Kitamura et al. | 416/97 R |
| 7,497,660 B2 | 3/2009 | Liang | |
| 7,510,376 B2 * | 3/2009 | Lee et al. | 416/97 R |

(Continued)

FOREIGN PATENT DOCUMENTS

| | | |
|---|---|---|
| DE | 10 2011 00198 | 7/2011 |
| EP | 1 016 774 | 7/2000 |

(Continued)

OTHER PUBLICATIONS

Extended European Search Report, EP 11250936.9, Rolls Royce North American Technologies, Inc., May 27, 2014.

*Primary Examiner* — Dwayne J White
*Assistant Examiner* — Justin Seabe
(74) *Attorney, Agent, or Firm* — Krieg DeVault LLP

(57) ABSTRACT

A gas turbine engine flow path member is disclosed which includes an extending end portion capable of contacting a surface of the turbine engine. The flow path member includes openings to pass a cooling fluid to cool the extending end portion. The flow path member, furthermore, can be made using a variety of approaches. To set forth just two non-limiting examples, the flow path member can be cast and it can be a laminated construction.

24 Claims, 6 Drawing Sheets

(56) References Cited

U.S. PATENT DOCUMENTS

| | | |
|---|---|---|
| 7,584,538 B2 | 9/2009 | Lee |
| 7,645,123 B1 | 1/2010 | Liang |
| 8,100,654 B1 * | 1/2012 | Liang .......................... 416/97 R |
| 8,113,779 B1 * | 2/2012 | Liang ............................ 416/92 |
| 8,628,299 B2 | 1/2014 | Ammann et al. |
| 2003/0021684 A1 | 1/2003 | Downs et al. |
| 2004/0096328 A1 * | 5/2004 | Soechting et al. .............. 416/92 |
| 2006/0120869 A1 * | 6/2006 | Wilson et al. ............... 416/97 R |

FOREIGN PATENT DOCUMENTS

| | | |
|---|---|---|
| EP | 1 445 424 | 8/2004 |
| EP | 1 762 701 | 3/2007 |
| EP | 1 927 727 | 6/2008 |

* cited by examiner

GAS TURBINE ENGINE FLOW PATH MEMBER

RELATED APPLICATIONS

The present application claims the benefit of U.S. Provisional Patent Application No. 61/427,132 filed Dec. 24, 2010 which is incorporated herein by reference

TECHNICAL FIELD

The present invention generally relates to gas turbine engine flow path components, and more particularly, but not exclusively, to cooled gas turbine engine blades.

BACKGROUND

Providing gas turbine engine flow path members capable of being cooled remains an area of interest. Some existing systems have various shortcomings relative to certain applications. Accordingly, there remains a need for further contributions in this area of technology.

SUMMARY

One embodiment of the present invention is a unique gas turbine engine flow path member. Other embodiments include apparatuses, systems, devices, hardware, methods, and combinations for cooling gas turbine engine flow path members. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
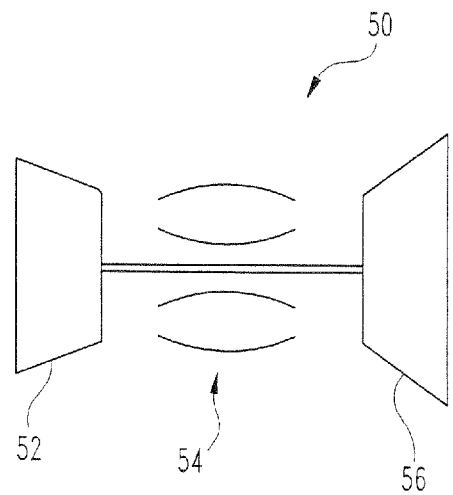
FIG. 1 depicts one embodiment of a gas turbine engine.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, a gas turbine engine 50 is disclosed having a compressor 52, combustor 54, and turbine 56. The gas turbine engine 50 can include a variety of flow paths and in one non-limiting form includes a flow path that traverses through the compressor 52, combustor 54, and turbine 56. The gas turbine engine 50 is depicted as a single spool turbojet engine in the illustrated embodiment but can take a variety of forms in other embodiments. To set forth just a few non-limiting examples, the gas turbine engine 50 can be a multispool engine in some forms. Additionally and/or alternatively, the gas turbine engine 50 can be a turbofan, turboshaft, or turboprop engine. In some embodiments the gas turbine engine 50 can be an adaptive cycle and/or variable cycle engine. Furthermore, the gas turbine engine 50 can be used as a powerplant for an aircraft. As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. Further, the present inventions are contemplated for utilization in other applications that may not be coupled with an aircraft such as, for example, industrial applications, power generation, pumping sets, naval propulsion, weapon systems, security systems, perimeter defense/security systems, and the like known to one of ordinary skill in the art.

Turning now to FIGS. 2 and 3a-3c, various non-limiting embodiments of a flow path member 58 are disclosed. The flow path member 58 can be disposed in any flow path in communication with the gas turbine engine 50 and in one non-limiting embodiment can be located in a turbomachinery component of the gas turbine engine 50. The member 58 can be a rotating member of the turbomachinery component such as a blade or can be a relatively stationary member such as a vane. In one non-limiting embodiment the member 58 can take the form of a rotating turbine blade.

In the illustrative embodiment the flow path member 58 can include a curved aerodynamic shape having a variety of surfaces depicted and includes a leading edge and a trailing edge. In other embodiments the flow path member 58 can take other forms. The member 58 can extend radially into the flow path of the gas turbine engine 50 and can have a variety of attributes such as sweep, stagger, and twist, to set forth just a few non-limiting examples.

The member 58 includes an extension 60 which is provided to project from an end 62 of the flow path member 58. In one non-limiting embodiment the extension 60 is a squealer that can be used to contact a surface of the gas turbine engine 50 flow path in which the flow path member 58 is disposed. The extension 60 can take a variety of forms and can project into the flow path a variety of distances.

The member 58 includes cooling openings 64 provided near the end 62 between an inner part 66 and an outer part 68 and are used to deliver a cooling fluid to influence temperatures of the member 58. In one form the cooling openings 64 are used to deliver fluid to cool the extension 60 during operation of the gas turbine engine. The extension 60 can be set back from an outer side 70 of the member 58 such as to position a discharge of the cooling openings 64 between the inner part 66 and the outer part 68. In some embodiments the extension 60 can be set back from the outer side 70 around the entire periphery of the extension 60. In further embodiments the set back can be uniform around the periphery.

Figure 2:
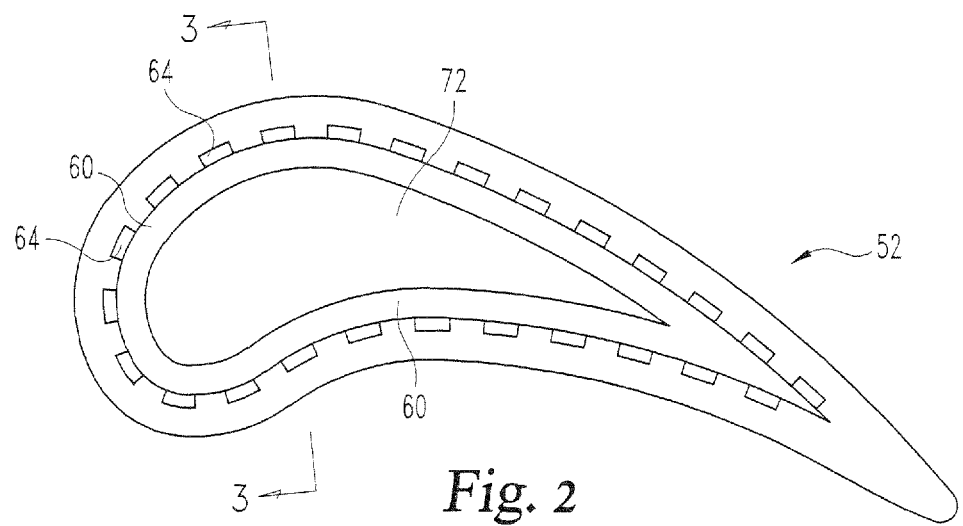
FIG. 2 depicts one embodiment of a flow path member.
Figure 3A:
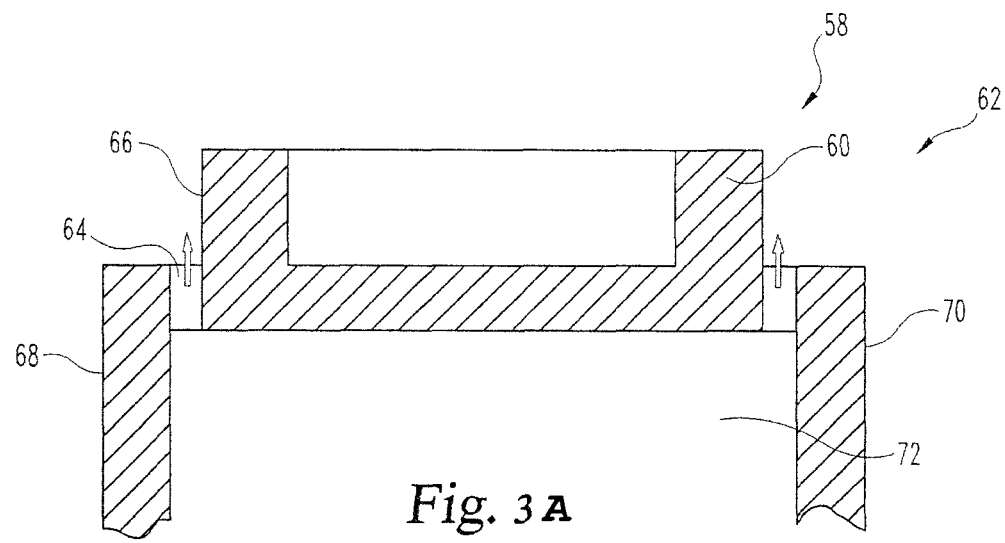
FIG. 3a depicts one embodiment of a flow path member.
Figure 3B:
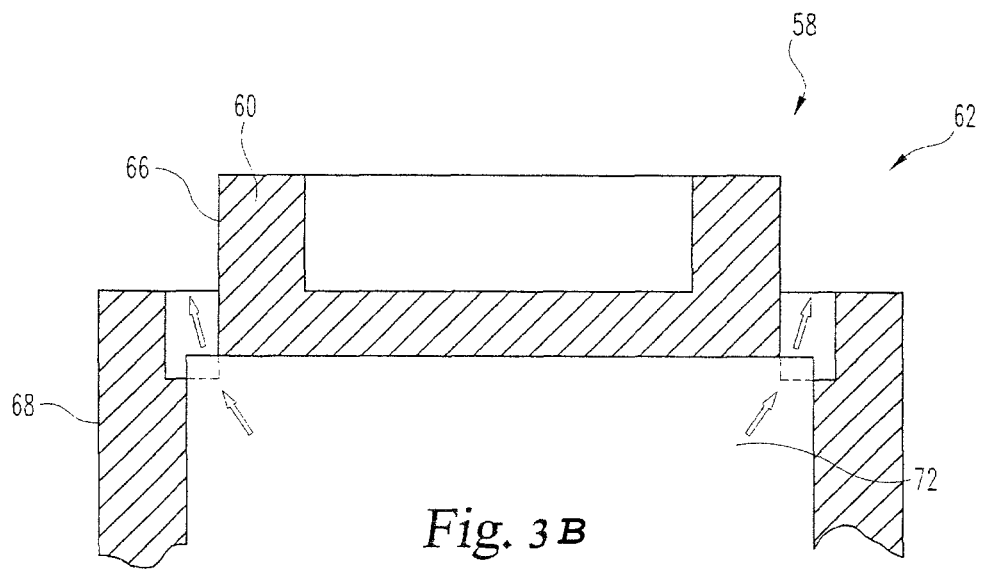
FIG. 3b depicts one embodiment of a flow path member.
Figure 3C:
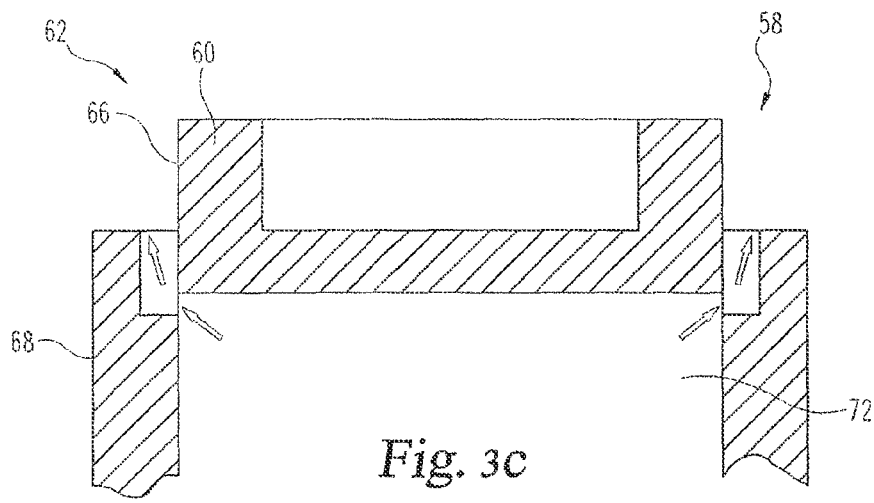
FIG. 3c depicts one embodiment of a flow path member.
Figure 4:
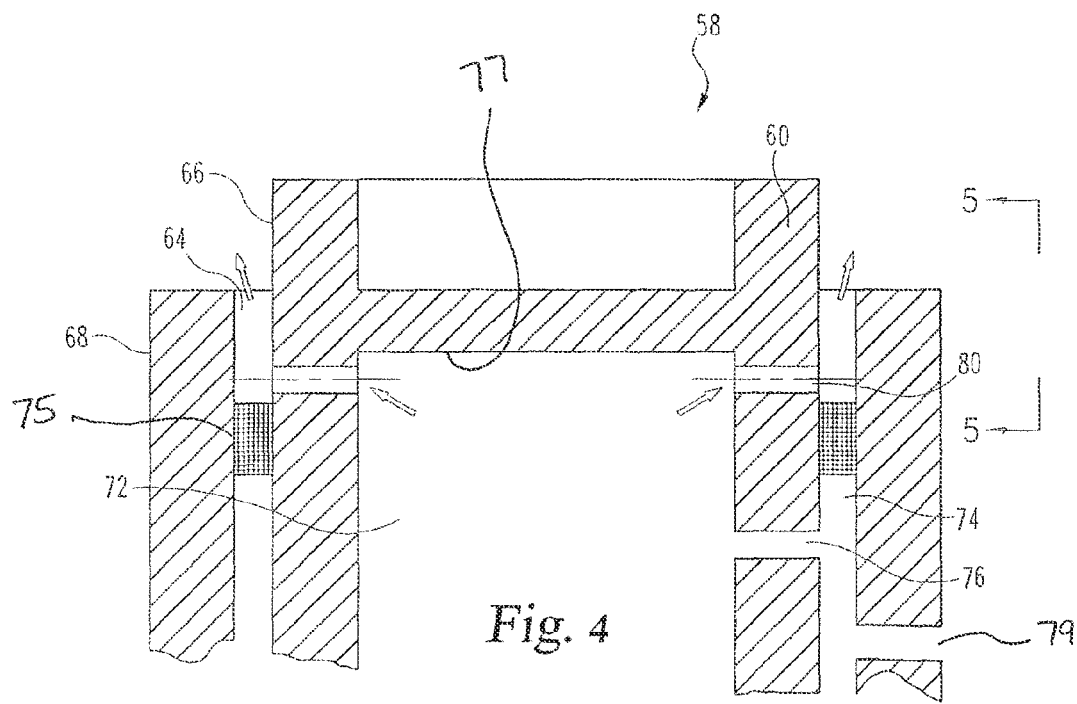
FIG. 4 depicts one embodiment of a flow path member.

The cooling openings 64 can have a variety of shapes and orientations as will be described below and can be used to flow cooling fluid from the volume 72 at a variety of rates, temperatures, and pressures. The volume 72 can receive the cooling fluid from a variety of sources such as, but not limited to, the compressor 52. As seen in FIG. 2, the cooling openings 64 can have a quadrilateral shape in some embodiments. Other embodiments may have shapes other than quadrilateral. For example, the cooling openings 64 can have an elliptical shape, or any other shapes. The openings 64 can be arranged around the member 58 and can be located near any of the pressure side, suction side, leading edge and trailing edge portions of the member 58. In one form the cooling openings 64 are provided around the leading edge, pressure side, and suction sides. The cooling holes can have a variety of configurations within the member 58. FIGS. 3a-3c which depict a portion of the member 58 along sightline 3 shown in FIG. 2 illustrate just a few non-limiting possibilities. FIG. 3a depicts the cooling openings 64 formed between the inner part 66 and outer part 68 such that the opening 64 includes a surface extending from the inner side of the outer part 68 and a surface extending from the outer side of inner part 66. FIG. 3b depicts the cooling opening 64 having a step formed in the outer part 68 and material between an outside surface of the inner part 66 and an inside surface of the outer part 68. FIG. 3c depicts the opening 64 formed in the outer part 68.

Turning now to FIGS. 4 and 5a-5c, an embodiment of the member 58 is depicted in which the member 58 includes a walled construction forming a cooling space 74 between the outer part 68 and the volume 72, and a radial dam 75 separating the cooling space 74 from the openings 64. Not all embodiments having a cooling space 74 need also have the radial dam 75. The cooling space 74 can be fed via openings 76 formed in the portion disposed between the cooling space 74 and the volume 72. The openings 76 can have a variety of shapes and sizes and can pass a fluid from the volume 74. A number of openings 76 can be provided in the member 58 and they can, but need not, be identical. The outer part 68 can, but need not, have apertures in which the fluid from the cooling space 74 is passed. Fluid can pass into the cooling space 74 and provide impingement cooling and/or transpiration cooling to the member 58.

The member 58 of the illustrative embodiment includes openings 80 through an inner portion of the member 58 leading to the cooling openings 64. The openings 80 can have a variety of shapes and sizes and can pass a fluid from the volume 74. A number of openings 80 can be provided in the member 58 and they can, but need not, be identical. Furthermore, the openings 80 can have different sizes and shapes than any other openings provided in the member 58.

In one form of the member 58, the inner part 66 extends radially away from an end of the member 58 to form the portion between the outer part 68 and the volume 72.

Figure 5A:
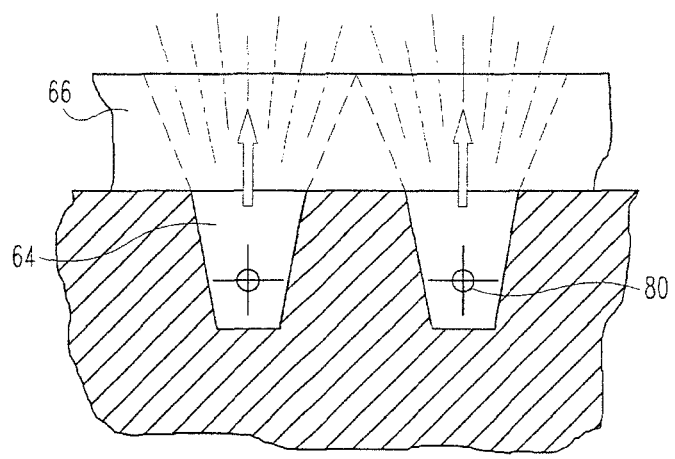
FIG. 5a depicts one embodiment of a flow path member.
Figure 5B:
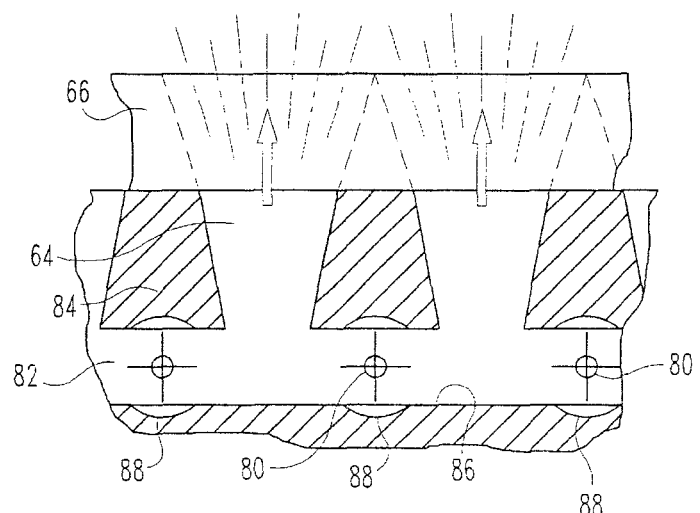
FIG. 5b depicts one embodiment of a flow path member.
Figure 5C:
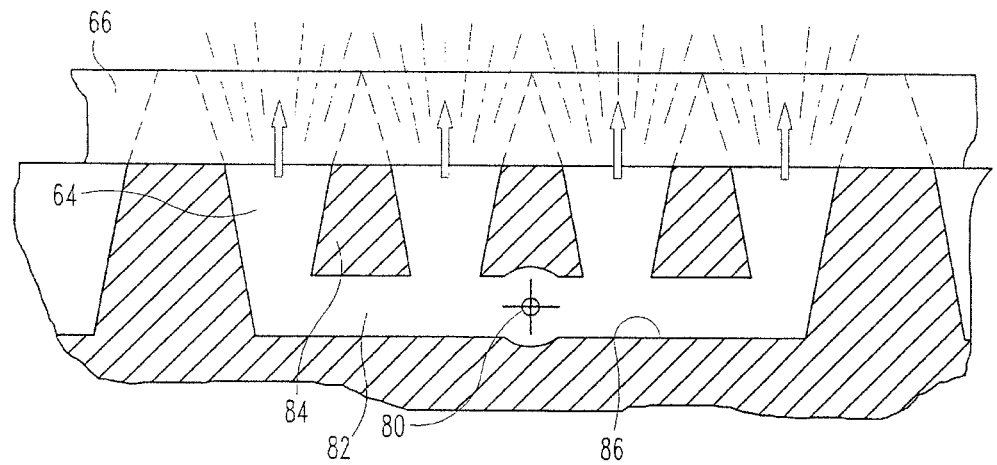
FIG. 5c depicts one embodiment of a flow path member.

The openings 80 and cooling openings 64 can have a variety of configurations within the member 58. FIGS. 5a-5c depict a portion of the member 58 along sightline 5 shown in FIG. 4 and illustrate just a few non-limiting possibilities. FIG. 5a depicts openings 80 providing fluid from the volume 72 to the cooling openings 64. The cooling openings 64 extend below the openings 80 and are shaped to increase a cross flow distance towards the discharge of the cooling openings 64. A single opening 64 is provided for each cooling opening 64. FIG. 5b depicts a number of openings 80 providing fluid to a common space 82 located between pedestals 84 and a surface 86. Recesses 88 can be provided in surface 86. FIG. 5c depicts an opening 80 providing fluid to a space 82 located between pedestals 84 and the surface 86. The fluid exits through a number of cooling openings 64. A recess 88 is also provided in this embodiment.

Figure 6A:
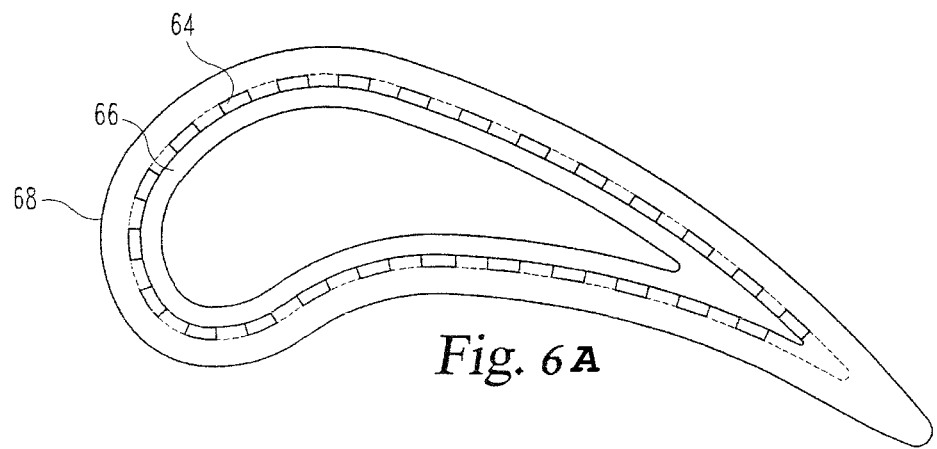
FIG. 6a depicts one embodiment of a flow path member.
Figure 6B:
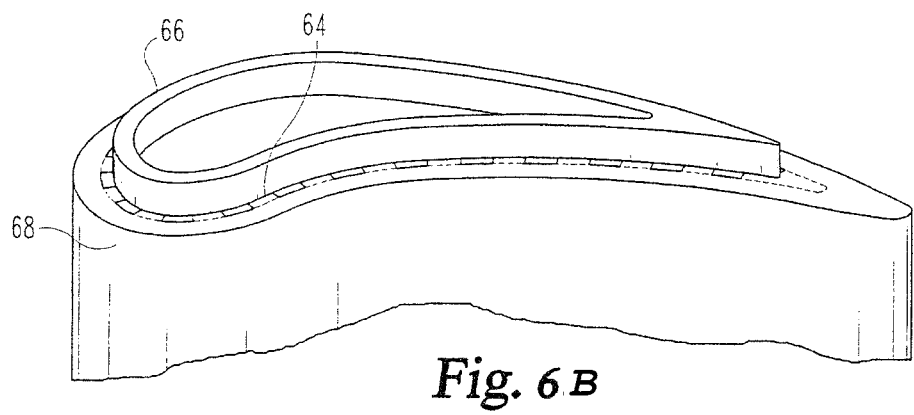
FIG. 6b depicts one embodiment of a flow path member.

FIGS. 6a and 6b depict an embodiment of the flow path member 58 having a laminated construction. The outer member 68 is in the form of a coversheet and the inner member 66 is in the form of a spar. Such a laminated construction can be manufactured using a variety of techniques and can additionally have a variety of features not shown in the illustrated embodiment. One non-limiting form of construction includes fastening the flow path member 58 together using brazing. The embodiment depicted in FIG. 4 could be made using a laminated construction in which the portion having the opening 76 and 80 is the spar and extends to form the extension 60. Layers other than those depicted in FIGS. 6a and 6b, as well as FIG. 4, can be provided.

Figure 7A:
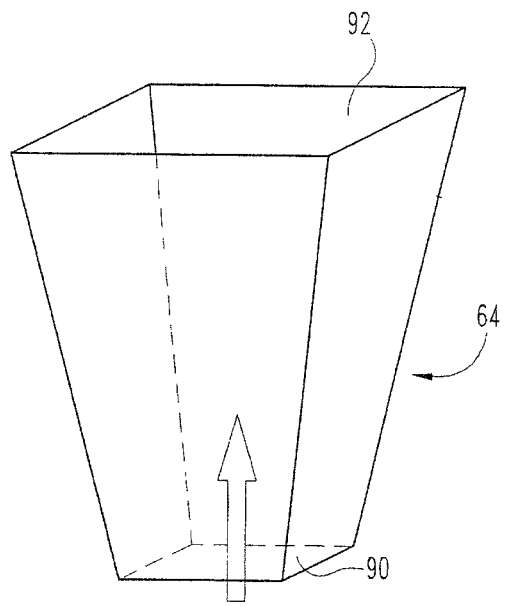
FIG. 7a depicts one embodiment of a cooling opening.
Figure 7B:
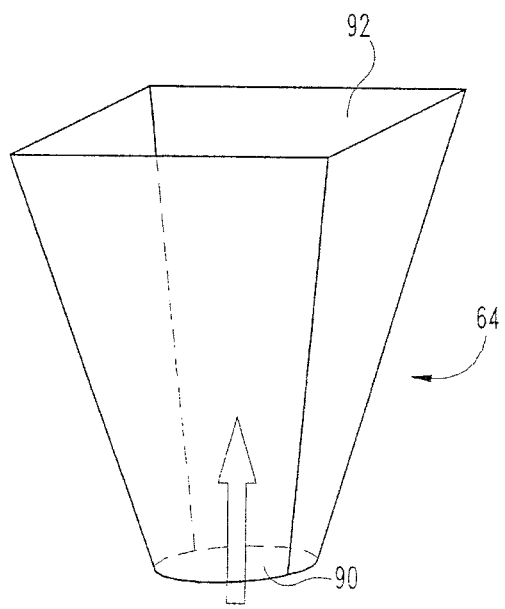
FIG. 7c depicts one embodiment of a cooling opening.

Turning now to FIGS. 7a and 7b, the cooling openings 64 can have a variety of shapes and sizes and extend from an entrance 90 to a discharge 92. For example, the cooling openings 64 can include a cross sectional area that changes along the distance of the cooling opening 64. In the two embodiments depicted, the cooling openings 64 include a cross sectional area that changes to provide a diffusion of the fluid flowing through the cooling openings 64. Not all embodiments, however, need include a diffusion of flow through cooling openings 64. The embodiment of FIG. 6a, furthermore, includes a quadrilateral shape at the entrance 90 and a quadrilateral shape at the discharge 92. The embodiment of FIG. 6b, however, includes a round shape at the entrance 90 and a quadrilateral shape at the discharge 92.

Combinations and variations of the flow path member 58, as well as any portions of the flow path member 58, are contemplated.

As will be appreciated from the above discussion, the terms inner part and outer part are used for convenience of description herein and are not meant to be limited to components separately manufactured and assembled to form the member 58. Some forms of the member 58 can be cast as a unitary whole, and others can be assembled from parts to form the member 58. Such assemblies can include, but are not limited to, laminated constructions as discussed above.

One aspect of the present application provides an apparatus comprising a gas turbine engine having a fluid cooled airfoil member disposed in a flow path and having a plurality of walls extending along a span of the member and enclosing an open interior, the walls forming a cooling passage therebetween, an inner wall of the plurality of walls extending into the flow path beyond a portion of an outer wall of the plurality of walls, and a plurality of apertures in the airfoil member having an upstream inlet and a downstream exit and operable to pass a fluid therethrough oriented to cool the inner wall that extends beyond the portion of the outer wall, wherein the downstream exits of the apertures are non-circular.

One feature of the present application provides wherein the inner wall forms a sacrificial rubbing member near the end of the airfoil member and used in case of contact with a surface of the flow path, wherein the inner wall extends radially away from the rubbing member past an end of the outer wall.

Another feature of the present application provides wherein the fluid that passes through the plurality of apertures is air withdrawn from a portion of the gas turbine engine, wherein the inner wall includes a plurality of openings which communicate the fluid to the plurality of apertures from the open interior.

Yet another feature of the present application provides wherein each of the plurality of openings are in communication with a corresponding one of the apertures of the plurality of apertures.

Still yet another feature of the present application provides wherein the plurality of apertures is oriented to pass fluid in a spanwise direction from a location between the inner wall and the outer wall, the inner wall forming a spar of the airfoil member and the outer wall forming a coversheet.

A further feature of the present application provides wherein the inner wall includes openings through which cooling fluid is passed from the open interior into the cooling passage, wherein the outer wall includes cooling holes through which the cooling fluid from the open interior is passed, and wherein the portion of the outer wall is an end of the outer wall.

A still further feature of the present application further includes a radial dam in the cooling passage to separate the cooling passage from the apertures.

Yet still a further feature of the present application provides wherein the cooling passage is formed between a base (e.g. reference numeral 77 shown in FIG. 4) of the inner member and an end of the outer member, the inner member not extending past an end of the outer member, Another aspect of the present application provides an apparatus comprising a gas turbine engine having a rotatable turbomachinery component and a flow path through the rotatable turbomachinery component, an airflow member extending into the flow path and having a periphery that includes a pressure side, suction side, leading edge, and trailing edge, a contact member extending from an end of the airflow member to provide a sacrificial surface in case of contact of the airflow member with a wall of the flowpath, a recess surface between the contact member and the airflow member, and a plurality of apertures located in the recess surface and oriented to pass a cooling fluid, the plurality of apertures include exits adjacent to a surface of the contact member One feature of the present application provides wherein the contact member has a shape that follows the contours of the periphery, wherein the airflow member is disposed in a turbine of the gas turbine engine, and wherein the recess extends around the pressure side, suction side, leading edge, and trailing edge.

Another feature of the present application provides wherein the plurality of apertures is arranged to pass the cooling fluid having a streamline in the radial direction.

Yet another feature of the present application provides wherein the plurality of apertures have an upstream area smaller than a downstream area.

Still yet another feature of the present application provides wherein the airflow member includes a cooling pathway between an inner extending member and an outer extending member, the inner extending member forming the contact member.

A further feature of the present application provides wherein the apertures are quadrilateral in shape and are formed between the inner extending member and the outer extending member.

A still further feature of the present application provides wherein the inner extending member is a spar and the outer extending member is a coversheet, the coversheet including a plurality of openings.

Yet still a further feature of the present application further includes an air flow dam positioned in the cooling pathway, the inner extending member including openings to permit a cooling fluid from an interior of the airflow member to pass into the cooling pathway, the outer extending member including openings (e.g. reference numeral 79 in FIG. 4) to permit the cooling fluid to exit the air flow member.

Yet another aspect of the present application provides an apparatus comprising a gas turbine engine having a rotating component capable of altering a pressure of a flow stream through the rotating component, an airflow device positioned with the rotating component to pass a fluid flowing through the gas turbine engine, a rubbing tip set back from an edge of the airflow device and having a profile similar to the airflow device, and means for discharging a cooling fluid from the airflow device radially between the members.

One feature of the present application provides wherein the airflow device includes an inner radial member and an outer radial member, the inner radial member forming the rubbing tip, and which further includes means for transpiration cooling the airflow device.

Still another aspect of the present application provides a method comprising operating a gas turbine engine, conveying a working fluid through a flow path of the gas turbine engine in which the working fluid encounters an airfoil member disposed in the flow path, the airfoil member having an inner member extending along the span of the airfoil member and overhanging an end of the outer member, the inner member having an end radially away from the overhanging end and past the end of the outer member, flowing a cooling fluid from an interior of the airfoil member to a cooling space radially away from of the end of the outer member between the inner member and the outer member, and admitting a cooling fluid to the overhanging portion of the inner member via a passage from the interior of the airfoil member.

One feature of the present application provides wherein the flowing further includes encountering a radial dam disposed between the cooling space and the cooling fluid admitted to the overhanging portion.

Another feature of the present application provides wherein the airfoil member is a laminated construction.

Still another feature of the present application further includes transpiration cooling the airfoil member.

Yet still another feature of the present application provides wherein the admitting further includes diffusing the cooling fluid.

A further feature of the present application further includes impingement cooling the outer member.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
a gas turbine engine having a fluid cooled airfoil member disposed in a flow path and having a plurality of walls extending along a span of the member and enclosing an open interior,
the walls forming a cooling passage therebetween,
an inner wall of the plurality of walls extending into the flow path beyond an end of an outer wall of the plurality of walls,
a base extending from the inner wall, the base being located at the end of the outer wall of the fluid cooled airfoil member and serving as a base portion of a squealer and serving to enclose the open interior of the fluid cooled airfoil member; and a plurality of apertures in the airfoil member extending from the enclosed open interior and having an upstream inlet and a downstream exit and operable to pass a fluid therethrough oriented to cool the inner wall that extends beyond the end of the outer wall, wherein the downstream exits of the apertures are non-circular, and wherein the plurality of apertures extending from the enclosed open interior are bounded by the inner wall and the outer wall, and the plurality of apertures extend around an entire perimeter of the inner wall, the entire perimeter extending from a trailing edge around a pressure side to a leading edge, and from the leading edge around a suction side returning to the trailing edge.

2. The apparatus of claim 1, wherein the inner wall forms a sacrificial rubbing member near the end of the airfoil member and used in case of contact with a surface of the flow path, wherein the rubbing member of the inner wall extends radially away from and past the end of the outer wall.

3. The apparatus of claim 2, wherein the fluid that passes through the plurality of apertures is air withdrawn from a portion of the gas turbine engine, wherein the inner wall includes a plurality of openings which communicate the fluid to the plurality of apertures from the open interior.

4. The apparatus of claim 1, wherein each of the downstream exits are in communication with a corresponding passage extending from the open interior.

5. The apparatus of claim 1, wherein the plurality of apertures is oriented to pass fluid in a spanwise direction from a location between the inner wall and the outer wall, the inner wall forming a spar of the airfoil member and the outer wall forming a coversheet.

6. The apparatus of claim 1, wherein the inner wall includes openings through which cooling fluid is passed from the open interior into the cooling passage, wherein the outer wall includes cooling holes through which the cooling fluid from the open interior is passed.

7. The apparatus of claim 6, which further includes a radial dam in the cooling passage to separate the cooling passage from the apertures.

8. The apparatus of claim 1, wherein the cooling passage is formed between the base of the inner wall and an end of the outer wall.

9. An apparatus comprising:
a gas turbine engine having a rotatable turbomachinery component and a flow path through the rotatable turbomachinery component;
an airflow member extending into the flow path and having a periphery that includes a pressure side, suction side, leading edge, and trailing edge;
a contact member extending from an end of the airflow member to provide a sacrificial surface in case of contact of the airflow member with a wall of the flowpath, the contact member having a base used to enclose an open interior of the airflow member;
a recess surface between the contact member and the airflow member; and
a plurality of apertures located in the recess surface and positioned around all sides of the airflow member, the plurality of apertures oriented to pass a cooling fluid, the airflow member including an inner extending member and an outer extending member, the inner extending member forming the contact member, the plurality of apertures include exits having a surface formed by the contact member and the outer extending member.

10. The apparatus of claim 9, wherein the contact member has a shape that follows the contours of the periphery, wherein the airflow member is disposed in a turbine of the gas turbine engine, and wherein the recess surface extends around the pressure side, suction side, leading edge, and trailing edge.

11. The apparatus of claim 10, wherein the plurality of apertures is arranged to pass the cooling fluid having a streamline in the radial direction.

12. The apparatus of claim 9, wherein the plurality of apertures have an upstream area smaller than a downstream area.

13. The apparatus of claim 9, wherein the airflow member includes a cooling pathway between the inner extending member and the outer extending member.

14. The apparatus of claim 13, wherein the apertures are quadrilateral in shape and are formed between the inner extending member and the outer extending member.

15. The apparatus of claim 13, wherein the inner extending member is a spar and the outer extending member is a coversheet, the coversheet including a plurality of openings.

16. The apparatus of claim 13, which further includes an air flow dam positioned in the cooling pathway, the inner extending member including openings to permit a coding fluid from the open interior of the airflow member to pass into the coding pathway, the outer extending member including openings to permit the cooling fluid to exit the air flow member.

17. An apparatus comprising:
a gas turbine engine having a rotating component capable of altering a pressure of a flow stream through the rotating component;
an airflow device positioned with the rotating component to pass a fluid flowing through the gas turbine engine, the airflow device having an interior into which a coding fluid is provided;
a rubbing tip set back from an edge of the airflow device and having a profile similar to the airflow device, the rubbing tip covering the interior of the airflow device to create an enclosed space for the cooling fluid; and
cooling openings for discharging the cooling fluid from the airflow device radially between the rubbing tip and the edge, the cooling openings defined in part by the rubbing tip and in part by the airflow device and being located around an entire periphery of the rubbing tip including pressure and suction sides of the airflow device.

18. The apparatus of claim 17, wherein the airflow device includes an inner radial member and an outer radial member, the inner radial member forming the rubbing tip, and which further includes means for transpiration cooling the airflow device.

19. A method comprising:
operating a gas turbine engine;
conveying a working fluid through a flow path of the gas turbine engine in which the working fluid encounters an airfoil member disposed in the flow path, the airfoil member having an inner member extending along the span of the airfoil member and overhanging an end of an outer member, the overhanging portion of the inner member having an end radially away from and past the end of the outer member;
flowing a cooling fluid from an enclosed interior of the airfoil member to a cooling space radially away from the end of the outer member between the inner member and the outer member, the enclosed interior bounded at a radial end of the airfoil member by the overhanging portion of the inner member and a base portion extending from the inner member; and
admitting a cooling fluid to flow past the overhanging portion of the inner member via at least one passage that uses a surface of the inner member and a surface of the outer member, the admitting originating from the enclosed interior of the airfoil member, wherein the at least one passage includes a plurality of passages located around the entire perimeter extent of the airfoil member.

20. The method of dam 19, wherein the flowing further includes encountering a radial dam disposed between the cooling space and the cooling fluid admitted to the overhanging portion.

21. The method of claim 19, wherein the conveying includes conveying a working fluid through the flow path in which the working fluid encounters the airfoil member in which the airfoil member has a laminated construction.

22. The method of claim 19, which further includes transpiration cooling the airfoil member.

23. The method of claim 19, wherein the admitting further includes diffusing the cooling fluid.

24. The method of claim 19, which further includes impingement cooling the outer member.

* * * * *

UNITED STATES PATENT AND TRADEMARK OFFICE
CERTIFICATE OF CORRECTION

PATENT NO. : 9,085,988 B2
APPLICATION NO. : 13/335276
DATED : July 21, 2015
INVENTOR(S) : Okey Kwan et al.

It is certified that error appears in the above-identified patent and that said Letters Patent is hereby corrected as shown below:

In the claims

In Claim 16, Column 8, Line 21, please delete the word "coding" and insert -- cooling -- therefor. Also in Claim 16, Column 8, Line 22, please delete the word "coding" and insert -- cooling -- therefor.

In Claim 17, Column 8, Line 31, please delete the word "coding" and insert -- cooling -- therefor.

Signed and Sealed this
Twenty-second Day of March, 2016

Michelle K. Lee
*Director of the United States Patent and Trademark Office*